US008598393B2

(12) United States Patent
O'Connor

(10) Patent No.: US 8,598,393 B2
(45) Date of Patent: Dec. 3, 2013

(54) PROCESS FOR REDUCING THE OXYGEN CONTENT OF HIGH-OXYGEN FEEDSTOCKS

(75) Inventor: Paul O'Connor, Hoevelaken (NL)

(73) Assignee: KiOR, Inc., Pasadena, TX (US)

(*) Notice: Subject to any disclaimer, the term of this patent is extended or adjusted under 35 U.S.C. 154(b) by 885 days.

(21) Appl. No.: 12/681,053

(22) PCT Filed: Oct. 16, 2008

(86) PCT No.: PCT/EP2008/064003
§ 371 (c)(1),
(2), (4) Date: Mar. 31, 2010

(87) PCT Pub. No.: WO2009/050249
PCT Pub. Date: Apr. 23, 2009

(65) Prior Publication Data
US 2010/0280301 A1    Nov. 4, 2010

(30) Foreign Application Priority Data
Oct. 18, 2007   (EP) .................................... 07118777

(51) Int. Cl.
*C07C 1/00*      (2006.01)
*C10G 1/08*      (2006.01)
(52) U.S. Cl.
USPC ............................ 585/240; 585/638; 585/640
(58) Field of Classification Search
USPC .......................................... 585/240, 640, 638
See application file for complete search history.

(56) References Cited

U.S. PATENT DOCUMENTS

| 4,304,649 | A | 12/1981 | Han et al. | |
|---|---|---|---|---|
| 7,199,278 | B2 * | 4/2007 | Fung et al. | 585/640 |
| 7,273,960 | B2 * | 9/2007 | Lattner | 585/638 |
| 7,829,751 | B2 * | 11/2010 | Levin et al. | 585/640 |
| 8,022,002 | B2 * | 9/2011 | Bozzano | 502/43 |
| 8,207,385 | B2 * | 6/2012 | O'Connor et al. | 585/240 |
| 2004/0064006 | A1 * | 4/2004 | Beech et al. | 585/639 |
| 2007/0293695 | A1 * | 12/2007 | Zoeller et al. | 560/232 |
| 2009/0026112 | A1 * | 1/2009 | Dierickx et al. | 208/119 |

OTHER PUBLICATIONS

International Search Report (ISR) for PCT Application No. PCT/EP2008/064003 (Publication No. WO 2009/050249), filed Oct. 16, 2008; ISR dated May 29, 2009; 5 pages.
J.D. Adjaye, and N.N. Bakhshi; Production of hydrocarbons by catalytic upgrading of a fast pyrolysis bio-oil. Part I: Conversion over various catalysts; Fuel Processing Technology, vol. 45, Apr. 6, 1995, pp. 161-183.
J.D. Adjaye, and N.N. Bakhshi; Production of hydrocarbons by catalytic upgrading of a fast pyrolysis bio-oil. Part II: Comparative catalyst performance and reaction pathways; Fuel Processing Technology, vol. 45, Apr. 4, 1995, pp. 185-202.

* cited by examiner

*Primary Examiner* — Nina Bhat
(74) *Attorney, Agent, or Firm* — Hovey Williams LLP

(57) ABSTRACT

A process is described for reducing the oxygen content of a high-oxygen feedstock. The process is particularly suitable for biomass-based feedstocks. The process comprises contacting the feedstock with carbon monoxide and/or coke in the presence of a catalyst. Conveniently, the coke may be present in the form of a deposit on the catalyst. Carbon monoxide may be generated in a regeneration step of the catalyst. The process may be carried out in conventional refinery equipment.

30 Claims, 2 Drawing Sheets

PROCESS FOR REDUCING THE OXYGEN CONTENT OF HIGH-OXYGEN FEEDSTOCKS

RELATED APPLICATIONS

This application claims priority to PCT International Patent Application No. PCT/EP2008/064003, filed Oct. 16, 2008, which claims the priority benefit of European Patent Application No. 07118777.7, filed Oct. 18, 2007, both of which are hereby incorporated by reference in their entirety.

BACKGROUND OF THE INVENTION

1. Field of the Invention

The invention relates generally to a process for reducing the oxygen content of high-oxygen feedstocks, and more particularly to the conversion of bio-oil components to hydrocarbon fuels.

2. Description of the Related Art

Increasingly, renewable resources are being studied as replacements for fossil fuels. In particular biomass materials are being looked at as a source for liquid fuels for internal combustion engines.

Liquid fuels obtained from crude oil consist predominantly of hydrocarbons and aromatics. The constituents are almost exclusively carbon (C), and hydrogen (H), and little or no oxygen. Conversion products from biomass invariably comprise significant amounts of oxygen. Ligno-cellulosic biomass and bio-oils derived therefrom typically have an oxygen content of at least 20% by weight, and sometimes as high as 50% by weight. The energy content of these materials is accordingly much lower than that of fossil fuels.

It is necessary to upgrade biomass-derived fuels by reducing their oxygen content. Techniques that have been proposed thus far include cracking, for example fluid catalytic cracking (FCC); hydro-cracking; hydro-treating; and hydro-deoxygenation. What these techniques have in common is that much of the oxygen removal relies on the reaction of oxygen with hydrogen to form water. The hydrogen is either supplied externally, or is consumed from the biomass feedstock. Externally supplied hydrogen is expensive, and adds significantly to the cost of biomass-derived fuels. If no external hydrogen is supplied the hydrogen content of the biofuel is reduced during the cracking process, which lowers the energy content of the fuel.

Thus, there is a particular need for a process for reducing the oxygen content of a high-oxygen feedstock that has a reduced hydrogen consumption as compared to existing processes.

There is a further need for a process that may be carried out in existing plant available in oil refineries.

BRIEF SUMMARY OF THE INVENTION

The present invention addresses these problems by providing a process for reducing the oxygen content of a high-oxygen feedstock, said process comprising the step of contacting the high-oxygen feedstock with carbon monoxide and/or coke at a temperature in the range of 100 to 300° C.

Another aspect of the invention comprises a method for carrying out the inventive process in standard refinery equipment.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of certain embodiments of the invention, given by way of example only and with reference to the drawings.

Figure 1:
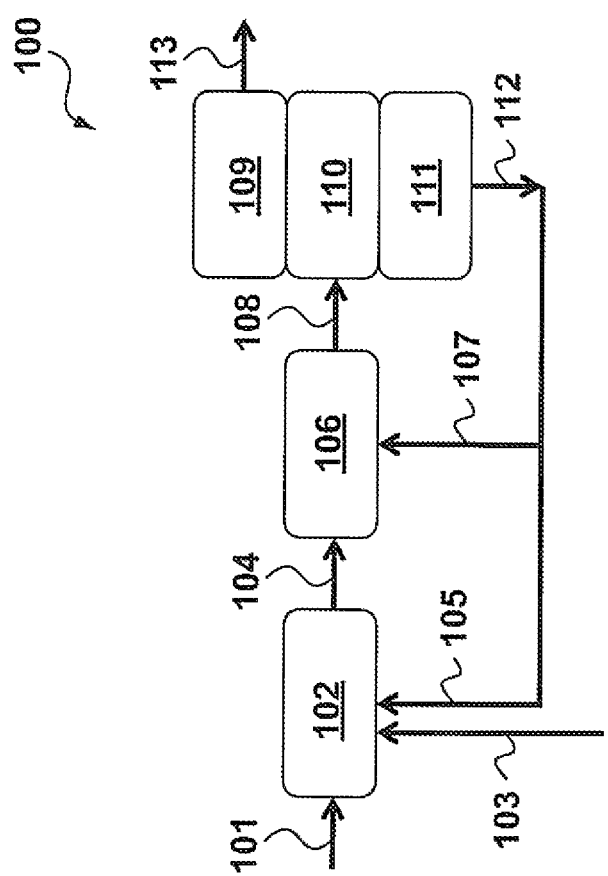
FIG. 1 is a diagram of a reaction scheme for the catalytic pyrolysis and the catalytic cracking of a biomass material

FIG. 1 is a diagrammatic depiction of one embodiment of the process 100 of the present invention.

In reactor 102 biomass material 101 is mixed with a particulate catalyst 105, and a fluidizing gas 103. The fluidizing gas 103 may be inert, or it may be a reducing gas, such as comprising hydrogen, carbon monoxide. Conveniently the gas could be flue gas from regenerator 111, which is rich in CO.

The temperature of the catalyst particles 105 and the fluidizing gas 13 is such that the temperature in reactor 102 does not exceed 200° C. It will be understood that biomass material 101 typically contains water, which will be driven off by fluidizing gas 103. The amount of water present in biomass material 101 is an important factor in determining the temperature in reactor 102, and must be taken into account when calculating the energy balance for reactor 102.

After the biomass material 101 and the catalyst particles 105 have become thoroughly mixed in reactor 102, the mixture 104 is transferred to fluid cracker 106. A second stream 107 of catalyst particles is introduced at this point. Catalyst stream 107 is hot, so as to maintain a cracking temperature in fluid cracker 20 of from 250 to 550° C., preferably from 350 to 450° C.

The cracking reaction taking place in fluid cracker 106 reduces the oxygen content of the feedstock. If CO is present in the fluidizing gas, at least part of the oxygen reduction proceeds via the following reaction:

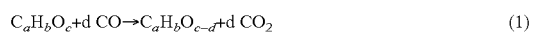

$$C_aH_bO_c + d\,CO \rightarrow C_aH_bO_{c-d} + d\,CO_2 \qquad (1)$$

To the extent that deoxygenation is the result of this reaction it does not involve the consumption of hydrogen.

From fluid cracker 106 the reaction mixture 108 is transferred to product/catalyst separator 110 (e.g., comprising cyclones and a stripper). Product is condensed in product recovery unit 109, producing product stream 113. The catalyst particles, which are covered with coke (a by-product of the fluid cracking reaction) are sent to regenerator 111. In regenerator 111 an oxygen containing gas (e.g., air, or an oxygen/steam mixture) is admitted, to burn off the coke. The amount of oxygen and the temperature in regenerator 111 are controlled so as to maximize the amount of carbon monoxide in flue gas 103. This gas is piped to reactor 102. Regenerated catalyst particles 112, which are hot and, in this embodiment, virtually coke free (e.g., less than 0.2% coke by weight of the catalyst) are recycled in part to reactor 102, and in part to fluid reactor 106. The split is controlled so as to obtain the desired temperatures in each of reactor 102 and fluid reactor 106.

Figure 2:
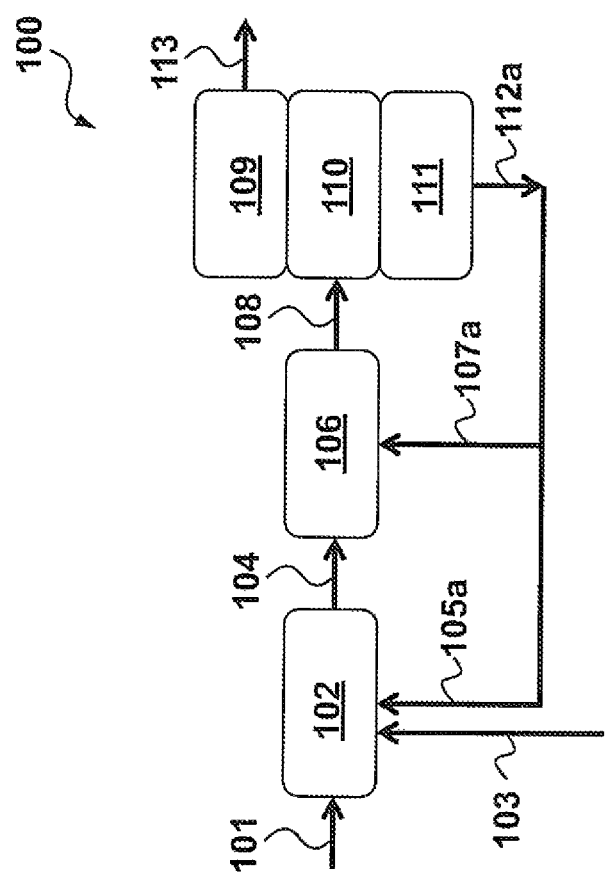
FIG. 2 is a diagram of in improved embodiment of the reaction scheme of FIG. 1

FIG. 2 is a diagrammatic representation of a second embodiment of the present invention. This embodiment differs from that of FIG. 1 in that the regeneration in regenerator 111 is controlled such that the regenerated catalyst particles (112a, 107a and 105a) retain at least 1 wt %, preferably about 2 wt % of coke. In fluid cracker 106 the feedstock reacts with carbon monoxide in the flue gas, as per equation (1), above. In addition, feedstock is deoxygenated by reaction with the coke deposit on the catalyst particles, as illustrated by equation (2):

$$C_aH_bO_c + e\ C \rightarrow C_aH_bO_{c-2e} + e\ CO_2 \quad (2)$$

For convenience the coke is depicted as elemental carbon, although it may contain small amounts of hydrogen.

It will be readily appreciated that the use of carbon monoxide in the flue gas and the residual coke on the catalyst particles permits a significant reduction in the oxygen content of the feedstock, without requiring the consumption of hydrogen.

To a large extent, conventional refinery equipment may be used for the process of the present invention. For example, 106, 110 and 111 can be the riser, the stripper and the regenerator of a conventional FCC unit.

Any high-oxygen feedstock may be used as feed 101. The feedstock may be liquid or solid. Examples of suitable liquid feedstocks include bio-oils and components of bio-oils. The term "bio-oil", as used herein, refers to liquid product resulting from a chemical treatment of a solid biomass. The chemical treatment may be pyrolysis, cracking, hydrotreatment, and the like.

Suitable examples of solid feedstocks include solid biomass materials, in particular biomass materials containing cellulose and/or ligno-cellulose. Examples include wood particles, straw, corn husks, bagasse, and other forms of forestry or agricultural waste materials.

Solid biomass materials may be fed directly into reactor 102 in the form of small particles. Fluidizing gas 103 carrying catalyst material 105 or 105a provides intimate mixing of the catalyst material and the solid biomass.

In an alternate embodiment, catalyst material 105 or 105a is brought into intimate contact with solid biomass material in a pre-treatment step (not shown) prior to introduction into reactor 102. Solid biomass may be brought into intimate contact with catalyst particles by mechanical processes, such as grinding, milling kneading, and the like. Such processes are disclosed in more detail in our pending patent application PCT/EP2007/054377, the disclosures of which are incorporated herein by reference. It will be appreciated that the presence of coke on the surface of the catalyst particles may act as a lubricant, thereby enhancing the penetration of the catalyst particle into the biomass particle.

It will be appreciated that the catalyst particles used in this pre-mixing step may be much smaller than the catalyst sizes customary for use in FCC processes. The latter are in the mm range, whereas for this pre-mixing step the catalyst particles have an average particle size in the range of from 50 nanometers to 40 micrometers, preferably from 150 to 500 nanometers. These catalyst particles are recovered from the product stream as "fines", and recycled to the pre-mixing step.

Accordingly, the process for deoxygenation of solid biomass may comprise two catalyst streams: a first catalyst stream comprising catalyst particles having an average particle size the range of from 50 nanometers to 40 micrometers, preferably from 150 to 500 nanometers, which is mixed with a solid biomass in a mixer positioned upstream of reactor 102, and which is recovered from the product stream in separator 109; and a second catalyst stream comprising catalyst particles suitable for fluidized beds (i.e., in the mm range), which is recovered from regenerator 111 (with or without a coke residue) and recycled into 102 and 106. The chemical composition of the two catalyst streams may be the same or different, with the understanding that, even if the same catalyst is used in both stream, the catalyst particles of the second stream will usually contain a binder.

Examples of suitable catalytic materials include clays, silicas, silica-aluminas, magnesia, magnesia-alumina, magnesia-silica-alumina, manganese compounds, lime, transition metal hydroxides, metal oxides, metal hydroxyl salts, zeolites, cationic layered materials, anionic clays, layered double hydroxides (LDHs), smectite clays, saponites, and mixtures thereof.

What is claimed is:

1. A process for reducing the oxygen content of a high-oxygen feedstock, said process comprising the step of contacting the high-oxygen feedstock with carbon monoxide and/or coke at a temperature in the range of 250-550° C., wherein said high-oxygen feedstock comprises ligno-cellulosic biomass and/or bio-oils derived therefrom.

2. The process of claim 1 wherein the coke is present on a particulate inorganic material.

3. The process of claim 2 wherein the particulate inorganic material is inert.

4. The process of claim 2 wherein the particulate inorganic material has catalytic properties.

5. The process of claim 4 wherein the coke is deposited onto the particulate inorganic material in a catalytic process.

6. The process of claim 5 wherein the catalytic process is an FCC process.

7. The process of claim 5 wherein the particulate inorganic material is selected from the group consisting of E-cat; spent cat, HT coked catalyst, and mixtures thereof.

8. The process of claim 3 wherein the particulate inorganic material is selected from the group consisting of sand, silica, and metal.

9. The process of claim 2 wherein the particulate inorganic material has a mean particle diameter in the range of from 10 nm to 3 mm.

10. The process of claim 1 which is carried out in a fluid bed.

11. The process of claim 1 wherein the feedstock has an oxygen content of 20 to 50 weight %.

12. The process of claim 11 wherein the oxygen content of the feedstock is reduced to less than 10 weight %.

13. The process according to claim 1, wherein said feedstock comprises bio-oil.

14. The process according to claim 1, wherein said process produces a bio-oil having reduced oxygen content relative to the oxygen content of said feedstock.

15. The process according to claim 1, wherein said feedstock comprises ligno-cellulosic biomass, wherein said ligno-cellulosic biomass is wood.

16. The process according to claim 1, wherein said step of contacting said high-oxygen feedstock with carbon monoxide and/or coke occurs in a reactor, wherein, prior to introducing said high-oxygen feedstock into said reactor, said high-oxygen feedstock is mixed with catalyst particles via a mechanical process, wherein said mechanical process comprises grinding, milling, and/or kneading.

17. The process according to claim 16, wherein said catalyst particles have an average particle size in the range of from 50 nanometers to 40 micrometers.

18. A process for the production of a biomass-derived fuel, said process comprising the steps of:
  a) converting a biomass material comprising cellulose and/or ligno-cellulose into a conversion product comprising oxygen; and
  b) contacting at least a portion of said conversion product with carbon monoxide and/or coke to thereby reduce the oxygen content of at least a portion of said conversion product and produce said biomass-derived fuel, wherein said biomass-derived fuel comprises a bio-oil having an oxygen content less than the oxygen content of said conversion product.

19. The process according to claim 18, wherein the converting of step a) is a pyrolysis process.

20. The process according to claim 18, wherein said converting of step a) and/or said contacting of step b) occur at a temperature in the range of from 250-550° C.

21. The process according to claim 18, wherein said biomass material has an oxygen content of 20 to 50 weight %.

22. The process according to claim 18, wherein the oxygen content of said conversion product is reduced to less than 10 weight %.

23. The process according to claim 18, wherein the coke is present on a particulate inorganic material.

24. The process according to claim 23, wherein said particulate inorganic material is inert.

25. The process according to claim 23, wherein said particulate inorganic material has catalytic properties.

26. The process according to claim 25, wherein said particulate inorganic material comprises a zeolite.

27. The process according to claim 23, wherein said particulate inorganic material has a mean particle diameter in the range of from 10 nm to 3 mm.

28. The process according to claim 18, wherein said biomass material comprises wood particles.

29. The process according to claim 18, wherein said converting of step a) and said contacting of step b) occur inside a reactor, wherein, prior to introducing said biomass material into said reactor, said biomass material is mixed with catalyst particles via a mechanical process, wherein said mechanical process comprises grinding, milling, and/or kneading.

30. The process according to claim 29, wherein said catalyst particles have an average particle size in the range of from 50 nanometers to 40 micrometers.

* * * * *